Feb. 21, 1928.
G. F. WIKLE
1,659,583
TIRE BUILDING MACHINE
Filed April 5, 1924
5 Sheets-Sheet 1
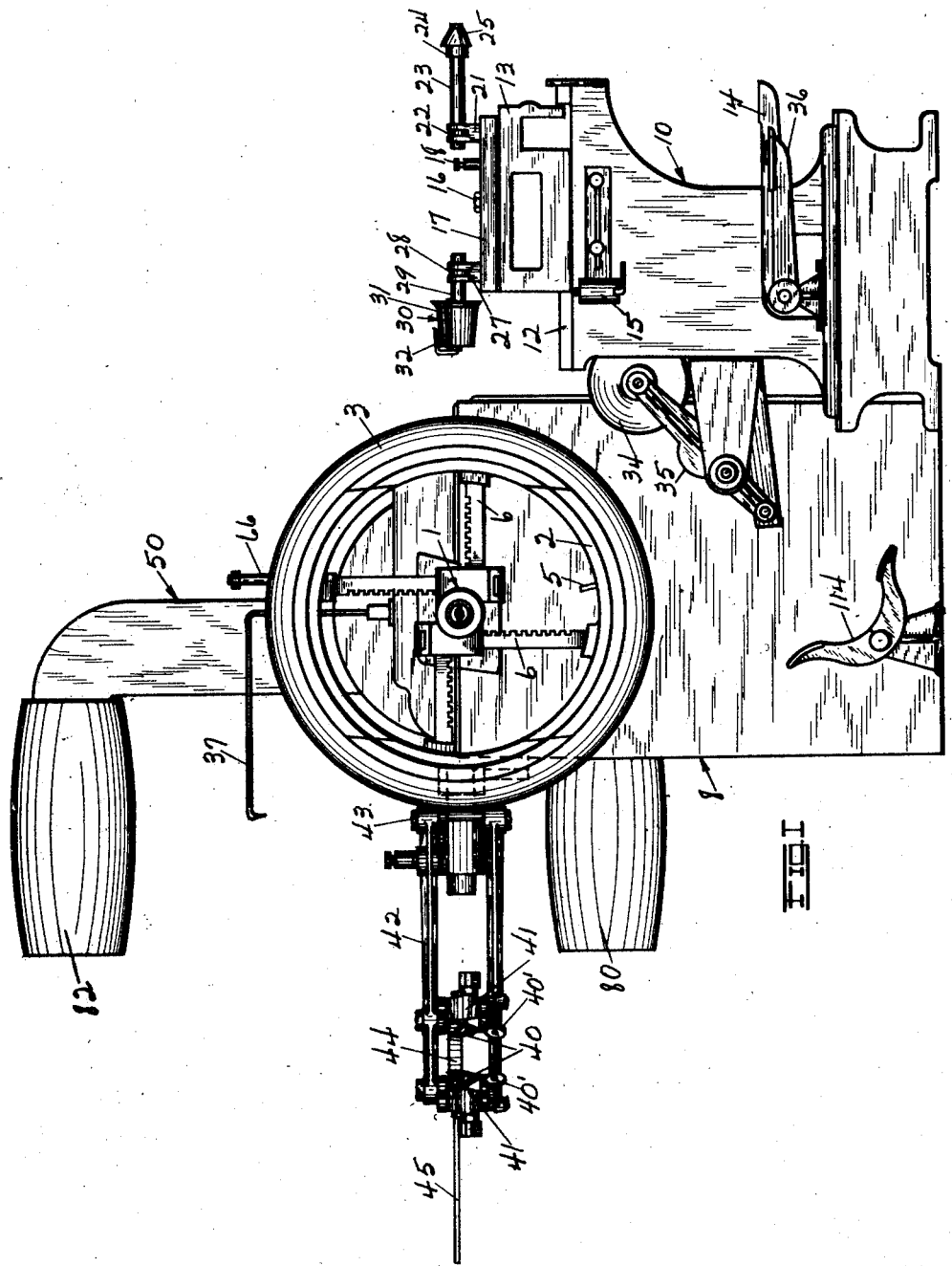
GEORGE F. WIKLE
INVENTOR
BY *Robert O. Harvey*
ATTORNEY.

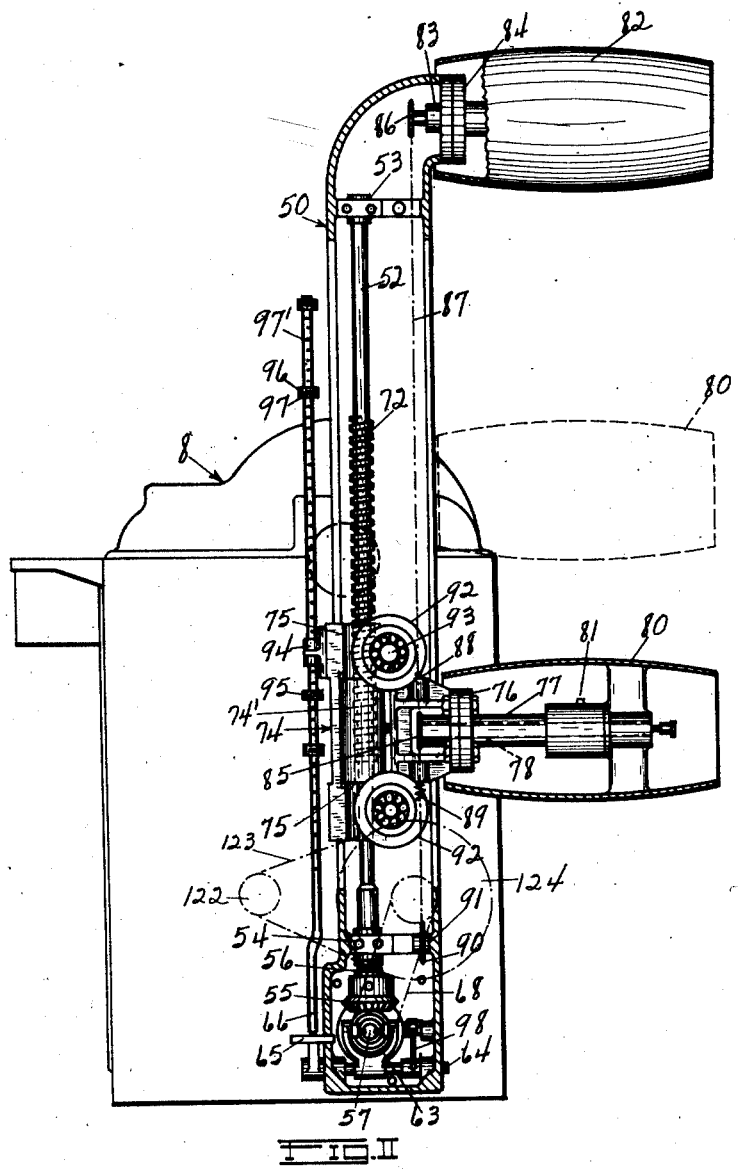

Feb. 21, 1928.
G. F. WIKLE
1,659,583
TIRE BUILDING MACHINE
Filed April 5, 1924
5 Sheets-Sheet 3
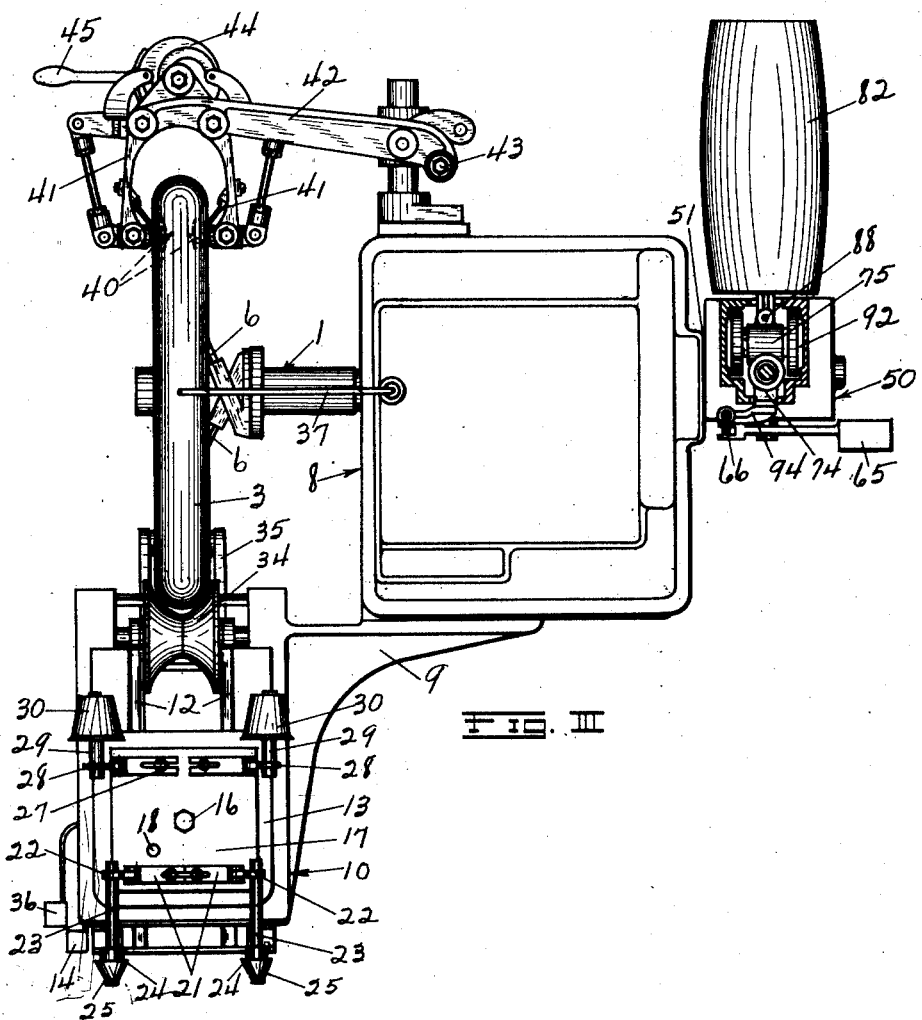
GEORGE F. WIKLE
INVENTOR
BY *Robert O. Harvey*
ATTORNEY

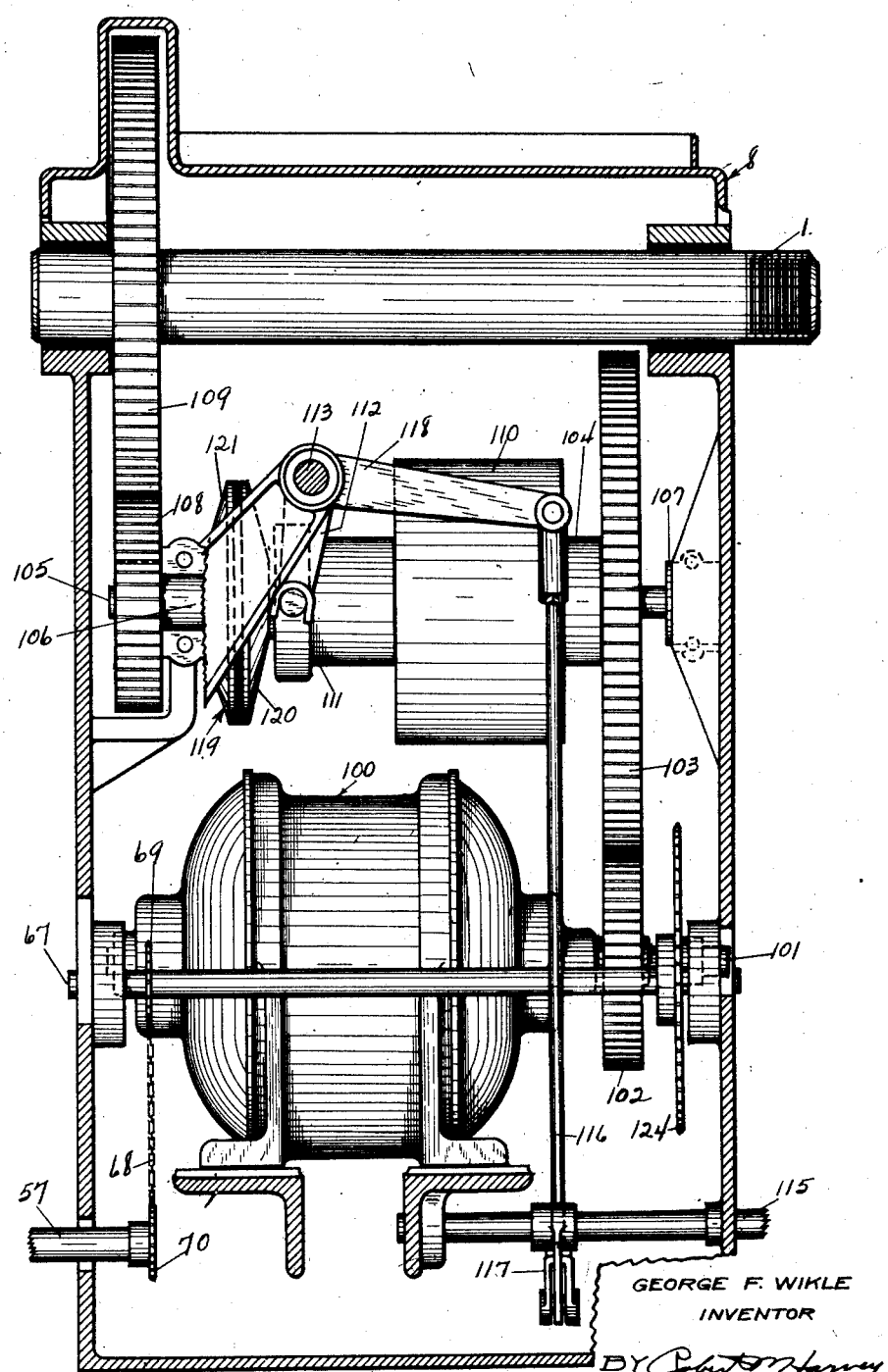

Feb. 21, 1928.
G. F. WIKLE
1,659,583
TIRE BUILDING MACHINE
Filed April 5, 1924      5 Sheets-Sheet 5
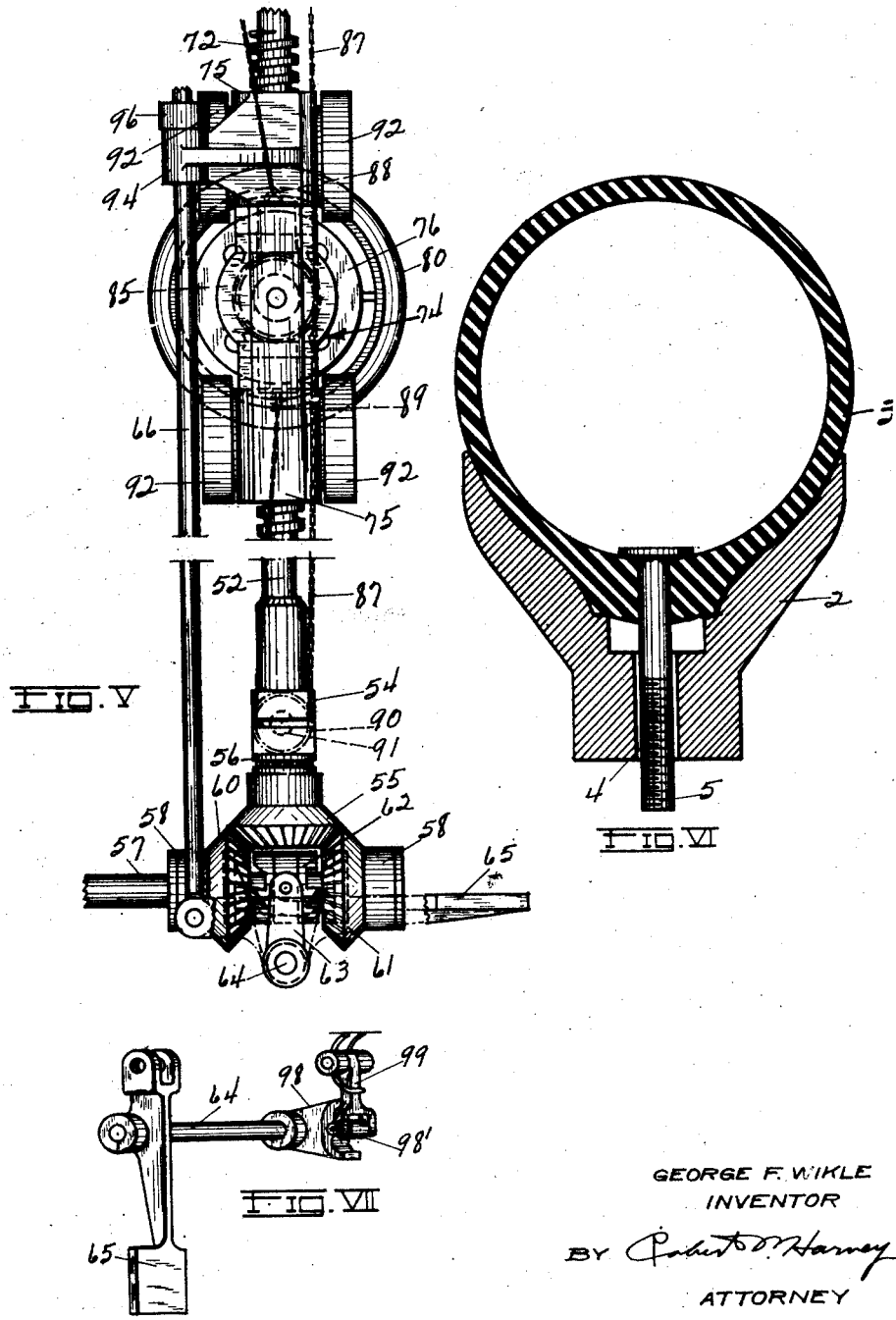
GEORGE F. WIKLE
INVENTOR
BY Robert D. Harney
ATTORNEY Patented Feb. 21, 1928.

1,659,583

UNITED STATES PATENT OFFICE.

GEORGE F. WIKLE, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS.

TIRE-BUILDING MACHINE.

Application filed April 5, 1924. Serial No. 704,497.

My invention relates to machines used in the building of the so-called casings of pneumatic tires, and more particularly to a machine for stretching and conditioning the material of which the carcass of such casings is formed.

In carrying out certain tire building methods the carcass material is first formed into an endless band of any desired number of plies. The material may be square woven fabric, cord fabric or the so-called weftless cord fabric, and the term fabric is hereinafter generally used to designate all of the above materials. This band is of a diameter less than the tread diameter of the core upon which the casing is formed, so that when the fabric is placed upon the core, the tread portion is elongated while the edge portions, being free, contract and are drawn in against the sides of the core. According to this method the band is preferably stretched and conditioned before being placed on the core. It is the main object of my invention to provide an improved device for carrying out this stretching and conditioning operation. More specific objects will be evident from the specification and claims.

In the following description and in the drawings, I show one embodiment of my invention in connection with a tire building machine of the type which carries out the method above referred to and in connection with which my invention is best understood, and described.

Figure 1 represents a front elevation of a tire building machine in connection with the stretching and conditioning mechanism, Figure 2 is a rear elevation of such machine and mechanism partly in section, Figure 3 is a plan view partly in section, Figure 4 is an elevation of the driving mechanism, Figure 5 is a detail of the control elements of the stretching and conditioning mechanism, Figure 6 is a detail sectional view of the core, Figure 7 is a perspective view of the means to prevent creeping of the clutch.

In the drawings 1 designates a rotatable shaft carrying the building core upon which the tire casing is formed. In the embodiment shown this core comprises a substantially U shaped ring 2 adapted to support an air bag 3 such as is customarily inserted in a tire casing of the cord type when the latter is placed in the mold. Ring 2 is shaped to conform to the profile of the bag as shown in Figure 6, and is provided with an aperture 4 to accommodate the air valve 5 of the bag. Ring 2 is formed in segments each secured to the ends of racks 6 which may be retracted to permit positioning of the air bag and again to permit the removal of the air bag with the finished tire thereon. Since the specific form of retracting means is immaterial and forms no part of my invention further description thereof is deemed unnecessary. Shaft 1 is carried in suitable bearings in housing 8 as shown in Figure 4.

Adjacent housing 8 and attached thereto at 9 is a standard 10 provided with guides 12 upon which is slidably mounted a carriage 13, normally held in retracted position but adapted to be advanced along guides 12 by a foot-pedal 14 and held in such advanced position by locking means 15. The carriage advancing and locking mechanism may be of the type shown and described in my co-pending application Serial Number 697,200, filed March 6, 1924.

Upon the carriage is pivotally mounted at 16 a turn-table 17 adapted to be locked in desired position by means of a pin 18 which seats in suitable apertures formed in the upper face of carriage 13.

The table 17 is provided with brackets 21 in which arms 22 are hinged which carry shafts 23 supporting adjacent their outer ends freely rotatable bead applying rolls 24. The outer ends of shafts 23 are provided with guide rolls 25 which hold the beads in position while being applied.

Similarly mounted in brackets 27 and arms 28 on the opposite side of the table 17 are shafts 29 carrying side wall applying rolls 30 preferably formed of relatively soft rubber. Associated with these rolls are tension rolls 31 and guides 32 which latter serve to uniformly position the side wall as it is applied in unit form to the tire carcass on the building core by rolls 30, the unit side wall being drawn down against rolls 31 by the operator to secure the desired degree of tension. This mechanism forms the subject matter of my co-pending application Serial Number 700,395, filed March 19, 1924, and need not be further described here.

The means for applying the tread element to the tire comprises a roll 34 carried in frame 35 and adapted to be moved against the carcass on the core, to apply the tread thereon, by foot-pedal 36 as fully shown and described in my co-pending application Serial Number 700,396, filed March 19, 1924.

A swinging arm 37 provided with a pointer which is positioned to overlie the center of the core, when the arm is swung to the position shown in Figure 3, aids the operator in properly placing the tread on the carcass prior to rolling it down by roll 34.

The unit side wall above referred to may include a so-called chafing strip which as applied by rolls 30 extends below the beads previously applied to the tire carcass. This extending portion is folded under and around the beads and against the interior of the casing. This is accomplished by folding disks 40 and 40' carried by swinging arms 41 mounted on bracket 42 pivoted to housing 8 at 43, the arms being operated by cam 44 through handle 45. The details of this folding mechanism and its operation are shown and described in my co-pending application Serial Number 705,377, filed April 9, 1924, matured into Patent No. 1,647,163, Nov. 1, 1927. The last movement of disks 40 after they have passed between the casing and the core is directly away from the core thus stripping the casing from the sides of the core. The ring 2 is then collapsed and the completed tire is removed.

The above description is sufficient to show the operations for which my stretching and conditioning mechanism is designed to prepare the fabric band. It will be noted that the fabric is placed upon a core comprising a yielding bag and that the various elements such as bead, tread, and sidewall elements for which the fabric bands constitute the foundation are placed in position by machine elements. It is obvious therefore that the stretching and conditioning of the fabric must be in conformity with the requirements of such machine operations and susceptible of such control by the operator that the continuity of the building operation is not broken.

The mechanism for stretching and conditioning the carcass material comprises a housing 50 secured to housing 8 at 51. A vertical shaft 52 is journaled in bearings 53 and 54 supported by housing 50. A bevel gear 55 is mounted on the lower end of shaft 52 and a ball thrust bearing 56 is provided between said gear and the lower bearing 54. A horizontal shaft 57 (see Figure 5) is mounted in bearings 58 in housing 50. This shaft has bevel gears 60 and 61, meshing with gear 55, freely mounted thereon and adapted to be alternatively connected to shaft 57 by clutch 62, splined on the latter to thereby drive vertical shaft 52. Clutch 62 is operated through yoke 63 mounted on rod 64, the latter being connected to foot-pedal 65 and rod 66. Shaft 57 is continuously driven as later described. Vertical shaft 52 is threaded at 72 and a frame 74 is mounted to travel thereon by means of threaded portion 74'.

Secured to frame 74 at 76 is a long bearing 77 in which is mounted a shaft 78 to the outer end of which a drum 80 is secured by set screws 81. A similar drum 82 is secured to a shaft 83 mounted in a stationary bearing 84 at the upper end of housing 50. The inner ends of shafts 78 and 83 are provided with sprockets 85 and 86 respectively. A sprocket chain 87 the ends of which are secured at 88 and 89 to frame 74 passes over an idle sprocket 90, mounted on a stud shaft 91 at the base of housing 50, over sprocket 86 and in driving relation with sprocket 85. As will be evident, movement of frame 74 will rotate drums 80 and 82 through chain 87. Frame 74 is guided in its movement by rolls 92 mounted on shafts 93 carried in ball bearings in arms 75 integral with the frame. These rolls engage the sides of the housing and maintain drum 80 in rigid alignment with drum 82 during the movement of the carriage.

Rod 66 passes through a projection 94 integral with frame 74 and said rod is provided with collars 95 and 96 secured in predetermined position by means of cotter pins 97 passing through the collars and holes 97' in said rod.

Power is applied to shafts 1 and 57 from a motor 100 positioned in housing 8. Shaft 101 of the motor carries a gear 102 which meshes with a gear 103 mounted on a sleeve 104 supported by and freely rotatable on intermediate shaft 105 (see Figure 4) supported in bearings 106 and 107 secured to housing 8. Shaft 105 carries a pinion 108 meshing with a gear 109 on shaft 1.

The sleeve 104 is integral with one member of a clutch 110 the other member 111 of which is splined to shaft 105 and is moved into driving relation with sleeve 104 by means of a fork 112 carried by a shaft 113 which is supported by housing 8 and is rocked from clutch pedal 114 mounted on shaft 115 through a link 116 connecting arm 117 of shaft 115 and arm 118 of shaft 113. The clutch may be any suitable type of friction clutch. Brake mechanism is shown at 119 member 120 of which is formed integral with member 111 and adapted when the clutch is moved into inoperative position to engage a base plate 121, connected to bearing 106.

Motor shaft 101 is provided with a sprocket 122 connected by sprocket chain 123 to sprocket 124 mounted on shaft 67 which carries at its other end a sprocket 69 connected by sprocket chain 68 to sprocket 70 on shaft 57. The above described clutch and brake permits control of the speed of rotation of the core, while shaft 57 is continuously driven at uniform speed.

At the beginning of the stretching and conditioning operation frame 74 with drum 80 is in upper position as indicated in dotted lines in Figure 2. As is clearly shown in Figures 1, 2 and 3, drums 80 and 82 are crowned in order that the band of material placed in position on the drums by the operator will automatically center itself during the stretching operation. The clutch 62 being in central or neutral position no movement is imparted to shaft 52. A band of material is hung on upper drum 82 and over drum 80; the operator through pedal 65 connects gear 61 to shaft 57 thereby driving shaft 52 and causing frame 74, and roll 80 carried thereby, to move downward to stretch and condition the band. The extent of stretch is predetermined by the position of collar 95. The projection 94 striking said collar forces rod 66 downward and aided by the weight of the rod throws clutch 62 across its neutral position and connects gear 60 to shaft 57 thereby reversing the movement of frame 74 and roll 80. As frame 74 reaches its upper or original position projection 94 strikes collar 96 raising rod 66 and since the weight of the rod is now opposed to the movement of clutch 62 the latter moves only to neutral position bringing frame 74 to a stop.

In order to prevent any tendency of the clutch 62 to creep from its operative and neutral positions a detent such as shown at 98 (see Figures 2 and 7) is mounted on rod 64. Member 98 is provided with suitable depressions in which roll 98' carried by spring-loaded arm 99 is adapted to rest when the clutch is in its desired positions.

It will be evident from the above description that the operator, having placed a band of carcass material over drums 82 and 80 and set the stretching and conditioning mechanism in motion, may turn his attention to the cementing of his core or otherwise preparing it for the carcass material. The stretching and conditioning mechanism performs its function without further attention and the operator, completing the preparation of the core, removes the conditioned fabric from the drums, places a second band thereon and, positioning the conditioned band on the core, proceeds with the necessary building operations. At the proper time he places the stretching and conditioning mechanism again in operation and continues his work at the building machine without substantial interruption. The stretching and conditioning mechanism again automatically in the meantime completes its work and the second band is ready for placing on the core at the time the operator is ready for it. This operation is continued for the various plies forming the tire, and permits of a substantially continuous building operation.

I claim:

1. A device of the character described comprising a housing a rotatable drum supported thereby, a carriage reciprocable within said housing and carrying a second rotatable drum, means operable through the movement of said carriage to rotate both of said drums, and means to control the movement of said carriage.

2. A device of the character described comprising a housing, a rotatable drum supported thereby, a worm shaft journaled in said housing a carriage mounted in driven relation on said shaft, a second rotatable drum carried by said carriage, means operable through the movement of the latter to rotate both of said drums and means to automatically control the movement of said carriage.

3. A device of the character described comprising a housing a rotatable drum supported thereby, a carriage reciprocable within said housing and carrying a second rotatable drum, means operable through the movement of said carriage to rotate both of said drums, and a reversing clutch controlling the movement of said carriage and operable by the carriage in its movement.

4. A device of the character described comprising a housing a rotatable drum supported thereby, a carriage reciprocable within said housing and carrying a second drum, said carriage normally positioned adjacent said first named drum, means adapted to move said carriage away from said first named drum and means carried by said carriage operable to reverse the movement thereof at a predetermined point in its travel and to bring said carriage to rest in its original position.

5. A device of the character described comprising a support, a rotatable drum mounted thereon, a carriage reciprocable along said support and carrying a second rotatable drum in parallel relation with said first mentioned drum and means operable through the movement of said carriage to rotate both of said drums.

6. A device of the character described comprising a support, a rotatable drum mounted thereon, a worm shaft journaled in said support, a carriage mounted in driven relation on said shaft, a second rotatable drum mounted in said carriage in parallel relation with said first mentioned drum, and means operable through the movement of the carriage to rotate both of said drums.

In testimony whereof I have signed my name to the above specification.

GEORGE F. WIKLE.